2 Sheets--Sheet 1.
S. G. RANDALL.
Seeding-Machines.
No. 6,053. Reissued Sept. 15, 1874.
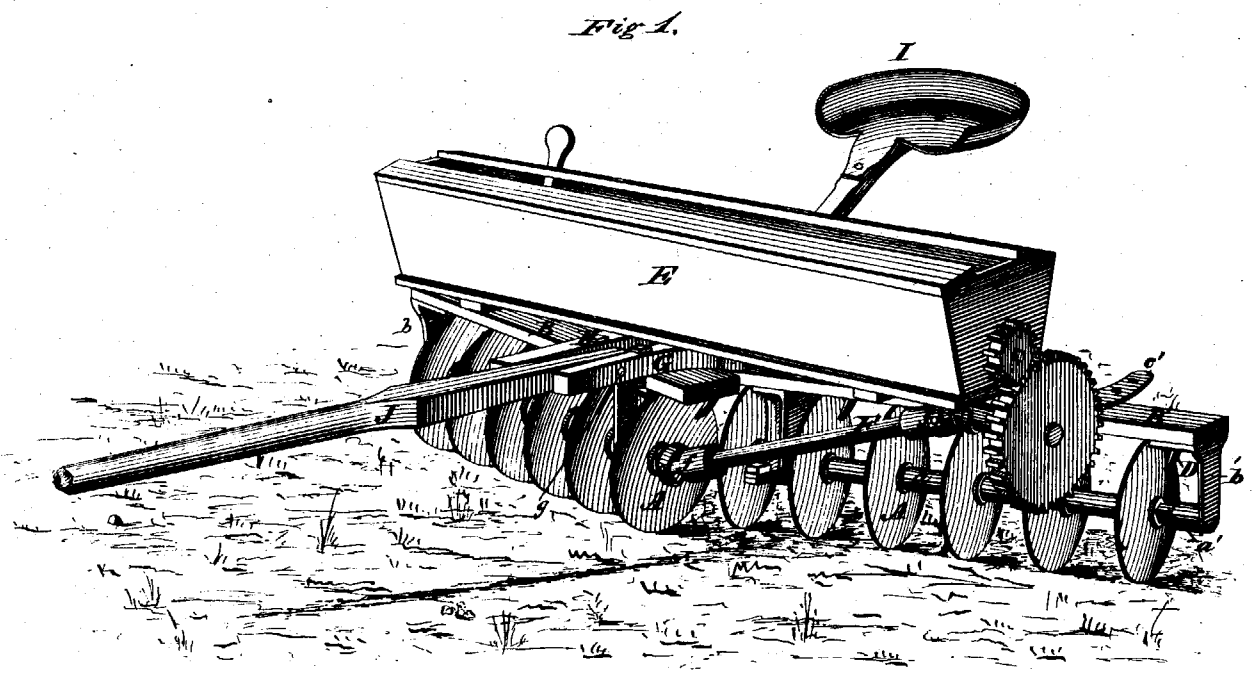
WITNESSES
Harry King
R. H. Morse
Silas G. Randall INVENTOR
Wm. D. Baldwin Jr. Attorney 2 Sheets--Sheet 2.
S. G. RANDALL.
Seeding-Machines.
No. 6,053. Reissued Sept. 15, 1874.
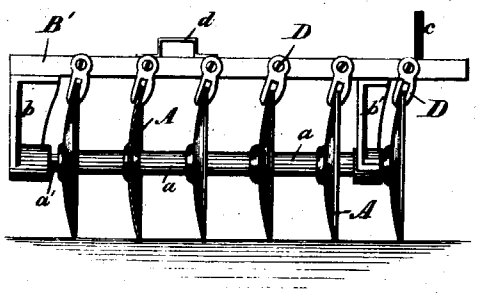
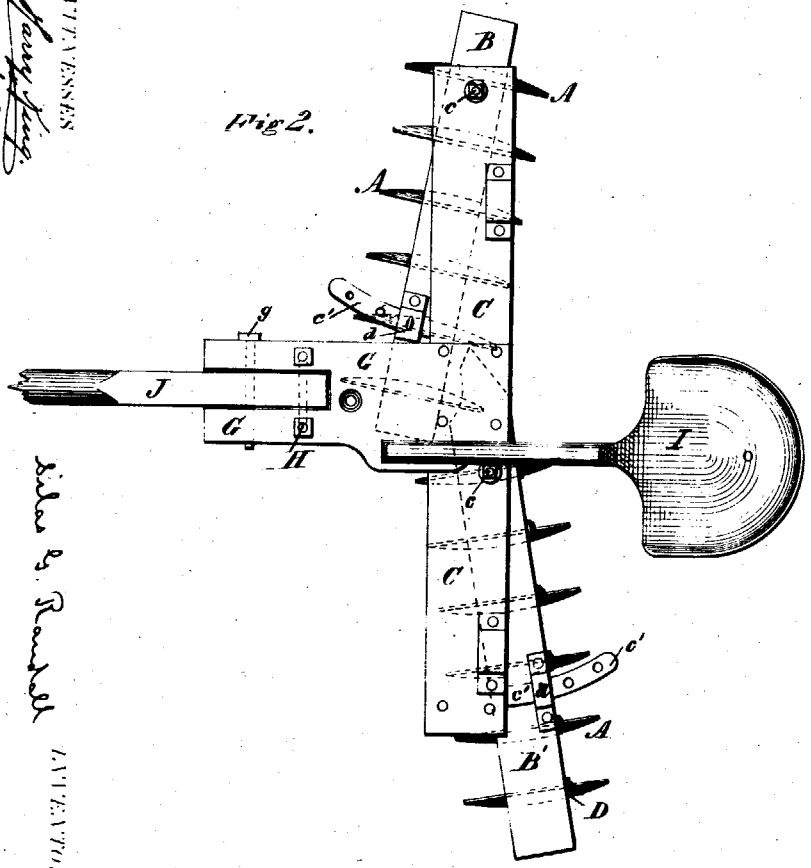
WITNESSES
Harry King.
B. H. Morse
By Wm. Baldwin his Attorney
Silas G. Randall INVENTOR

UNITED STATES PATENT OFFICE

SILAS G. RANDALL, OF PROVIDENCE, RHODE ISLAND, ASSIGNOR TO AMELIA A. RANDALL, OF SAME PLACE.

IMPROVEMENT IN SEEDING-MACHINES.

Specification forming part of Letters Patent No. 137,026, dated March 18, 1873; reissue No. 6,053, dated September 15, 1874; application filed May 9, 1874.

*To all whom it may concern:*

Be it known that I, SILAS G. RANDALL, of the city and county of Providence, in the State of Rhode Island, have invented certain new and useful Improvements in that class of agricultural implements known as Combined Wheel-Harrows, Cultivators, and Seeders, of which the following is a specification:

Letters Patent of the United States, No. 25,443, were granted to me September 13, 1859, for seeding-machines. This patent showed harrow-disks mounted on two independent shafts arranged at an angle to each other, a seed-box being mounted on each shaft, and the two hinged to a common frame, so that each could rock up and down on its connection with the frame without affecting the movement of the other. My present invention constitutes an improvement upon machines of the class shown in that patent, which I believe to have been originated by me.

The nature, purposes, and subject-matter of my improvement will hereinafter be specified.

In the accompanying drawings, Figure 1 represents a view in perspective of a machine in which all of the improvements herein claimed are embodied; Fig. 2, a plan view thereof with the seed-box removed, and Fig. 3 a rear view of one of the gangs.

In order to carry out my invention, I mount a series of concavo-convex disks or plate-wheels, A, loosely on a common axle, *a'*. These disks are kept apart at regulated distances by thimbles *a*, interposed between them, which thimbles also fit loosely upon the axle. By this mode of construction the disks and thimbles can readily be removed from or placed upon the axle, and are not liable to become fixed thereon by becoming rusty. The axles upon which the disks revolve are mounted in bearings in downhangers or brackets *b b'*, projecting from axle-bars or disk-beams B B'. The end disks may be secured by a nut. Scrapers or clearers D are pivoted upon the back of the bars, so as to swing freely laterally. They are also bifurcated, so as to embrace both faces of the disks and clear them from clogging matter. By this mode of construction the scrapers are positively held against the disks, and yet are free to yield to conform to any slight lateral movement they may have on their axles. The disks are arranged in two series or sets, each set being mounted on an axle common to all its disks, and each axle being secured in bearings on an independent or separate disk-frame or axle-bar, B B'. These disk-frames are in turn connected with a main frame or beam, C, in such manner that they lie in different vertical planes, their inner ends overlapping, and lying one behind the other. The right-hand disk-frame B is connected near its outer end with the outer end of the main frame or beam C, while its inner end is provided with a staple, loop, or eye, *d*, which fits over and slides upon a bar or sector, $c^1$, on the main frame, which bar is curved in the arc of a circle, of which the pivot-bolt *c* forms the center. By this means the inner end of the disk-frame may be adjusted backward or forward, so as to vary the angle of the disks relatively to the line of draft. The disk-frame may be held in any desired position by means of a pin passing through holes in the loop and sector. The left-hand axle-bar or disk-frame is pivoted near its inner end to the central portion of the main frame by a bolt, $c^2$, while its outer end is connected with the main frame by means of a loop and sector similar to those above described. The pivot-bolt $c^2$ is arranged slightly in rear of the other bolt, *c*, in order to give greater freedom of movement to the disk-frames, and to throw the inner disks one behind the other, in order more thoroughly to pulverize the soil at that point.

By the construction above described I am enabled, in adjusting the harrows, to vary the longitudinal distance between the inner disks of each gang—that is, the distance of one in front of the other—as well as their angular relation to each other and to the line of draft. As the two series of disks are placed out of line with each other, in adjusting them the front of the frame should be proportionately lowered on the draft-pole, in order to secure proper contact between the disks and the soil, and to cause them to cover the seed with more or less earth, as may be desired.

I provide for this contingency in the following manner: Hounds G are attached to the main frame C. A tongue, J, is pivoted between the hounds, and rocks vertically on its pivot-bolt *g*. The vertical range of movement of the tongue is regulated by means of a staple or stirrup, H, which is so set that the butt end of the pole, back of the pivot, ordinarily rests thereon. This staple is provided with threaded arms and nuts, by means of which it may be set up or down to vary the range of movement of the tongue, which is thus free to move up and down within certain limits; but its rear end is prevented from dropping below a certain point.

A seat, I, for the driver is mounted upon the frame, back of which it projects, so that the weight of the driver shall counterbalance that of the tongue and draft-frame.

When used as a seeder, a box, E, containing seeding mechanism of well-known construction is mounted on the frame.

When the disk-frames are made adjustable, it is essential that there should be a mode of connection between the seeding mechanism and the wheel-axles of such a character that the seeder shall be operated regardless of the relative position of the axles. I, therefore, connect the inner end of the axle of one of the series of disks to a driving-gear on the end of the seed-box by means of a shaft, F, provided at each end with universal joints *f* and suitable wrench-couplings, which may easily be detached, when desired. The seed-box is likewise so attached to the top plate that it can easily be removed or attached.

I claim as of my own invention—

1. The combination, with the main frame, of the independent disk-frames, arranged in different vertical planes relatively to each other, and with their adjacent inner ends overlapping, and lying one behind the other, substantially as hereinbefore set forth.

2. The combination of the main frame, the two disk-frames connected therewith in different vertical planes, with their adjacent ends lying one behind the other, a series of disks arranged in two independent sets, and an axle mounted on each disk-frame, on which axle each disk of the set is loosely mounted, substantially as hereinbefore set forth.

3. The combination, substantially as set forth, of a gang of disks, a disk-frame in which they are mounted, and a main frame, near the outer end of which the outer end of the disk-frame is pivoted, while its inner end is connected with the central portion of the main frame.

4. The combination, substantially as hereinbefore set forth, of the main frame, the adjustable tongue, and the disk-frames, adjustable longitudinally, as well as angularly, relatively to each other at their inner ends.

5. The combination of the seed-controlling apparatus with one of the disk-gangs by means of a universal-joint connection, whereby the seeding mechanism is driven by the disk-wheels.

6. The combination of the disk-shaft, disks mounted thereon, thimbles interposed between the disks, and clamp-nuts, these members being constructed and operating, substantially as set forth, to hold the disks securely, and yet admit of their being readily removed and replaced.

7. The combination of the disks and the forked pivoted scrapers overlapping the disks.

SILAS G. RANDALL.

Witnesses:

L. T. DARBY,

HENRY R. BIRDSALL.